(12) United States Patent
Franchi

(10) Patent No.: US 10,410,337 B2
(45) Date of Patent: Sep. 10, 2019

(54) SYSTEM AND METHOD FOR IDENTIFYING THE PRESENCE OR ABSENCE OF TRANSPARENT PILLS IN BLISTER PACKER MACHINES USING HIGH RESOLUTION 3D STEREO RECONSTRUCTION BASED ON COLOR LINEAR CAMERAS

(71) Applicant: Datalogic IP Tech S.R.L., Calderara di Reno, Bologna (IT)

(72) Inventor: Alessandro Franchi, Arezzo (IT)

(73) Assignee: Datalogic IP Tech S.r.l., Calderara di Reno, Bologna (IT)

( * ) Notice: Subject to any disclaimer, the term of this patent is extended or adjusted under 35 U.S.C. 154(b) by 81 days.

(21) Appl. No.: 15/539,330

(22) PCT Filed: Dec. 24, 2014

(86) PCT No.: PCT/IT2014/000348
§ 371 (c)(1),
(2) Date: Jun. 23, 2017

(87) PCT Pub. No.: WO2016/103286
PCT Pub. Date: Jun. 30, 2016

(65) Prior Publication Data
US 2017/0352149 A1    Dec. 7, 2017

(51) Int. Cl.
*G06T 7/00* (2017.01)
*G06T 7/593* (2017.01)
(Continued)

(52) U.S. Cl.
CPC .............. *G06T 7/0008* (2013.01); *A61J 1/035* (2013.01); *G06T 7/593* (2017.01); *A61J 3/00* (2013.01);
(Continued)

(58) Field of Classification Search
CPC ................. G06T 7/0008; G06T 7/593; G06T 2207/10012; A61J 1/035; A61J 3/00; A61J 7/0069; G06F 19/00
See application file for complete search history.

(56) References Cited

U.S. PATENT DOCUMENTS 5,590,170 A * 12/1996 Zweig .................. G01N 23/043
378/63
6,009,145 A * 12/1999 Zweig .................... G01N 23/04
378/58
(Continued)

FOREIGN PATENT DOCUMENTS

WO       2012037528 A2    3/2012

OTHER PUBLICATIONS

Bhat, Dinkar N. et al., "Stereo and Specular Reflection," International Journal of Computer Vision 26(2), 1998, pp. 91-106.
(Continued)

*Primary Examiner* — Mia M Thomas
(74) *Attorney, Agent, or Firm* — Dentons US LLP

(57) ABSTRACT

A system and method of inspection may include capturing image data by a stereo imaging device. A determination as to whether noise indicative of a transparent or specular object exists in the image data may be made. A report that a transparent or specular object was captured in the image data may be made.

26 Claims, 4 Drawing Sheets

(51) Int. Cl.
*A61J 1/03* (2006.01)
*A61J 3/00* (2006.01)
*A61J 7/00* (2006.01)
*G06F 19/00* (2018.01)

(52) U.S. Cl.
CPC ............. *A61J 7/0069* (2013.01); *G06F 19/00* (2013.01); *G06T 2207/10012* (2013.01)

(56) References Cited

U.S. PATENT DOCUMENTS

| | | | | |
|---|---|---|---|---|
| 6,636,298 | B1* | 10/2003 | Bachelder | G01N 21/8806 356/73.1 |
| 8,333,325 | B2* | 12/2012 | Moon | G06K 7/12 235/454 |
| 8,498,052 | B2* | 7/2013 | Moon | G03H 1/0011 250/566 |
| 8,565,475 | B2* | 10/2013 | Moon | G06K 7/10821 235/380 |
| 8,614,852 | B2* | 12/2013 | Kersey | G02B 5/1857 359/569 |
| 9,345,645 | B1 | 5/2016 | Chernyak | |
| 2006/0203231 | A1* | 9/2006 | Uto | H01N 21/47 356/237.2 |
| 2007/0273875 | A1* | 11/2007 | Ubukata | B65G 49/063 356/237.2 |
| 2010/0246007 | A1* | 9/2010 | Moon | G03H 1/0011 359/575 |
| 2012/0113416 | A1* | 5/2012 | Lange | G01N 21/95607 356/237.5 |

OTHER PUBLICATIONS

Bukovec, Marko, et al., "Image registration for visual inspection of imprinted pharmaceutical tablets," Measurement Science and Technology, IOP, Bristol, GB, vol. 18, No. 9, Sep. 1, 2007, 10 pages.

Miyazaki, Daisuke, et al., "Determining Shapes of Transparent Objects from Two Polarization Images," MVA2002 IAPR Workshop on Machine Vision Applications, Dec. 11, 2002, pp. 26-31.

Derganc, J., et al., "Real-Time Automated Visual Inspection of Color Tablets in Pharmaceutical Blisters," Real-Time Imaging, Academic Press Limited, GB, No. 9, Jan. 1, 2003; pp. 113-124.

Wohler, Christian, et al., "Stereo Image Analysis of Non-Lambertian Surfaces," International Journal of Computer Vision, Kluwer Academic Publishers, BO, vol. 81, No. 2, Aug. 28, 2008, pp. 172-190.

International Search Report for PCT/IT2014/000348, dated Sep. 29, 2015.

* cited by examiner

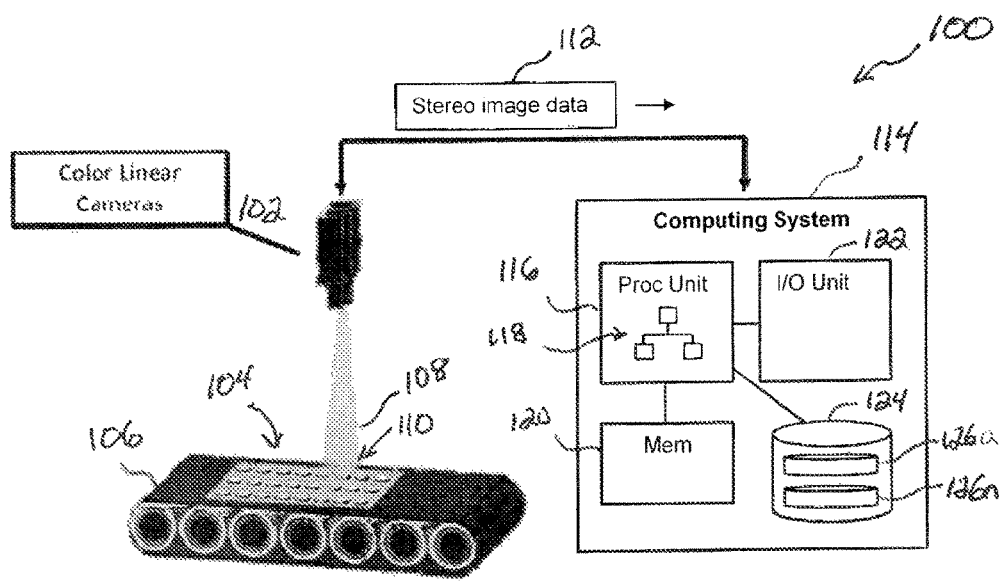
FIG. 1 System architecture.
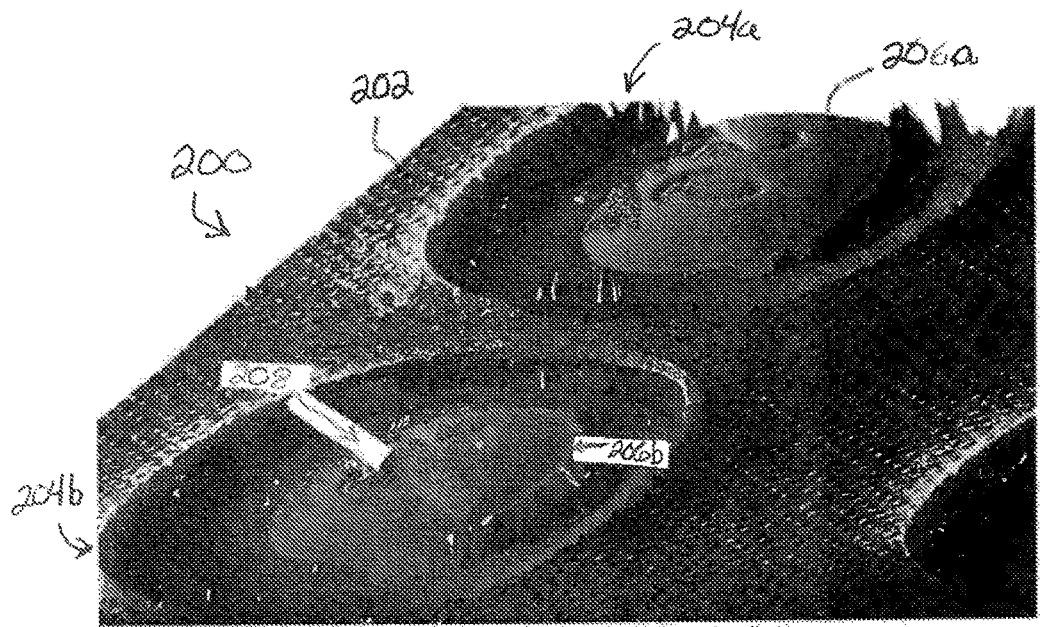
FIG. 2 Example of 3D stereo reconstruction using linear cameras

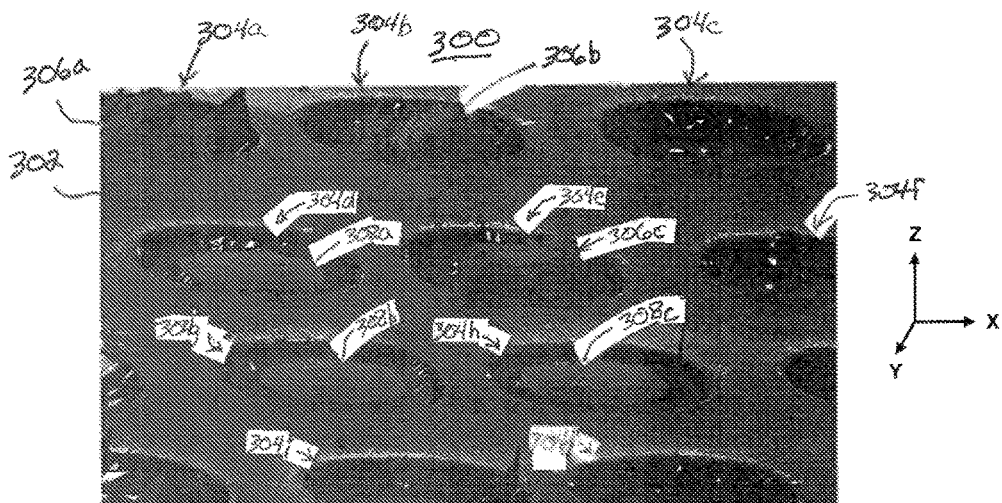
FIG. 3 High resolution 3D stereo reconstruction of the blister. Note the difference between empty alveolus and transparent capsules
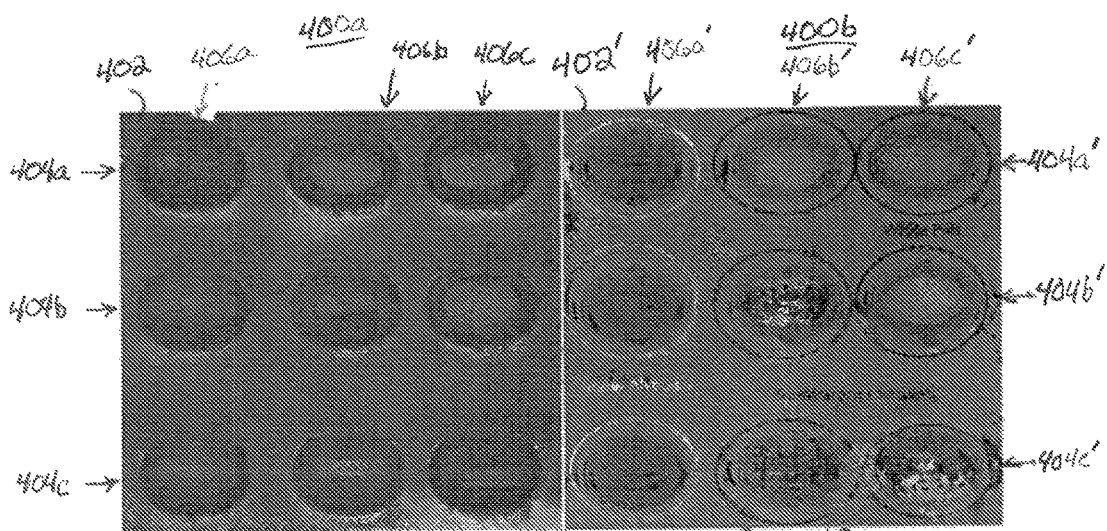
FIG. 4 Color image (left), height map from 3D reconstruction right). Note the transparent capsules in the left image and the correspondent height map on the right.

Output example of Impact 2D inspection tools on height map (red: empty alveolus, yellow: transparent pills, green: white pills).

SYSTEM AND METHOD FOR IDENTIFYING THE PRESENCE OR ABSENCE OF TRANSPARENT PILLS IN BLISTER PACKER MACHINES USING HIGH RESOLUTION 3D STEREO RECONSTRUCTION BASED ON COLOR LINEAR CAMERAS

CROSS REFERENCE TO RELATED APPLICATIONS

This application is a 371 National Stage Application of International Application No. PCT/IT2014/000348, filed Dec. 24, 2014, which is incorporated herein by reference in its entirety.

BACKGROUND

Inspection systems have traditionally had difficulty determining the presence or absence of transparent or specular objects. As an example, pills, tablets, and capsules that are transparent or specular and included in packaging, such as blister packaging produced by blister packer machines, are to be inspected to ensure that a pill is appropriately contained in a blister or compartment of the packaging for quality control purposes. Heretofore, such automated inspection has been difficult due to the transparent or specular nature of such pills.

Inspections on two-dimensional images, either color or grayscale, cannot effectively discriminate between empty compartments and compartments with transparent pills because intensities with and without transparent pills are similar. Three-dimensional inspection systems may be more successful than two-dimensional inspection systems, but blister packages are typically carried on a conveyor belt at high speeds, such that it is difficult to achieve high resolution reconstructions with typical camera equipment in sufficient time to operate in high production rate environments.

As understood in the art, noise from imaging tends to degrade inspection processes. Hence, designers of conventional image inspection systems use various techniques for reducing optical and other noise.

SUMMARY

An inspection system inclusive of a stereo imaging device may be utilized to perform inspection on transparent objects in high production rate environments. In one embodiment, the stereo imaging device may include linear cameras that operate at high image capture rates. Image data collected from the stereo imaging device may be processed in real-time so as to enable inspection at high rates. In one embodiment, processing of the image data may include 3D reconstruction that results in noise from transparent or specular pills, where the noise may be used to determine whether a transparent pill, or other transparent object, is captured in an image. Another embodiment may include mapping the 3D reconstructed image onto a height or 3D map such that noise measurements resulting from the transparent objects being within the image data can be used to determine that a transparent object exists.

One embodiment of a method of inspection may include capturing image data by a stereo imaging device. A determination as to whether noise indicative of a transparent or specular object exists in the image data may be made. A report that a transparent or specular object was captured in the image data may be made.

One embodiment of an inspection system may include a stereo imaging device configured to capture image data, and a processing unit in communication with the stereo imaging device. The processing unit may be configured (i) to determine whether noise indicative of a transparent or specular object exists in the image data, and (i) to report that a transparent or specular object was captured in the image data.

BRIEF DESCRIPTION OF THE DRAWINGS

Illustrative embodiments of the present invention are described in detail below with reference to the attached drawing figures, which are incorporated by reference herein and wherein:

FIG. 1 is an illustration of a system architecture for scanning objects to determine if transparent or specular objects exist;

FIG. 2 is an illustration of an illustrative 3D stereo reconstructed image data inclusive of objects, in this case pills, tablets, and/or capsules;

FIG. 3 is an illustration of an illustrative high resolution, 3D stereo reconstruction of a blister package inclusive of empty and populated alveoli;

FIG. 4A is an illustration of a color image inclusive of multiple alveolus being empty, having transparent capsules, and having normal pills;

FIG. 4B is an illustration of a height or depth map generated from 3D reconstruction of image data, and inclusive of multiple alveolus being empty, including transparent capsules, and including normal (e.g., white) pills;

DETAILED DESCRIPTION OF THE DRAWINGS

Figure 5:
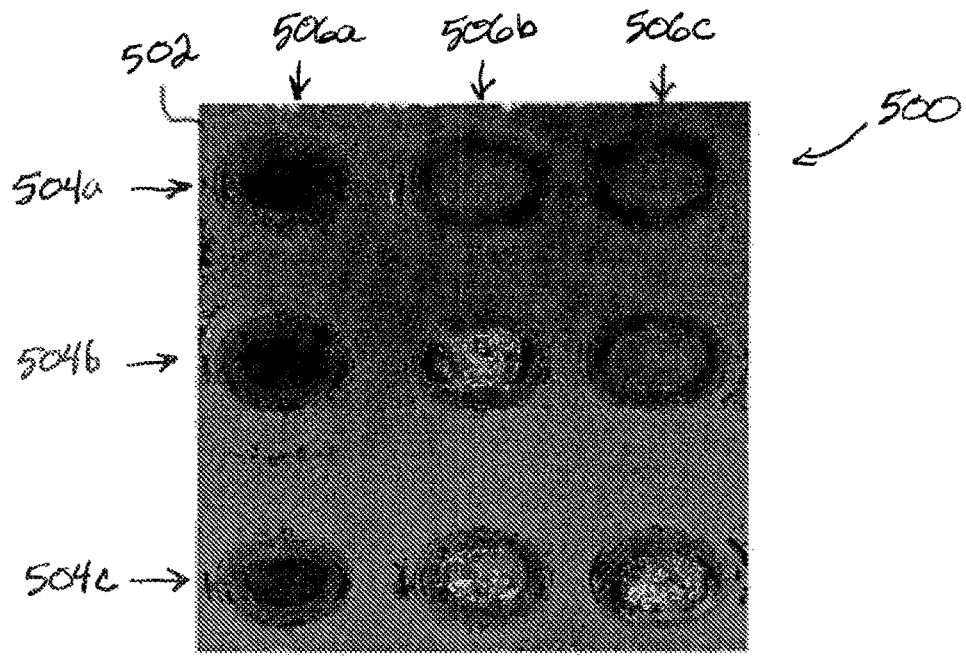
FIG. 5 is an illustration of an output or report of an inspection tool indicating which alveoli are empty, include transparent capsules, and include normal pills.

With regard to FIG. 1, an illustration of illustrative system architecture 100 for scanning objects to determine if transparent or specular objects exist is shown. The system architecture 100 may include a stereo imaging device 102 used to capture image data, and may be a pair of cameras configured to capture image data in a stereo manner, as understood in the art. In one embodiment, the stereo imaging device 102 are linear cameras, such as color linear cameras, which may operate at high rates. Linear cameras acquire the image of a surface line-by-line, exploiting a relative motion between the camera system and the object to be imaged. Alternatively, two-dimensional (2D) cameras may be utilized. However, the use of linear cameras, which have a single array of image sensors, operate at higher speeds than 2D cameras, thereby enabling real-time image capturing for certain applications, such as pill inspection systems.

In one embodiment, the stereo imaging device 102 may have imaging specifications, as follows: (i) height or Z resolution of 7 µm, (ii) optical or X, Y resolution of 30 µm per pixel, (iii) 3.5 kilo pixels, (iv) field-of-view width of 105 mm, (v) working distance of 200 mm, and (vi) linescan rate of 21 kHz (0.63 m/s). The use of linear cameras enable very high resolution 3D reconstructions in real-time. Other image processing techniques, such as depth maps, may also be utilized, as further described herein.

The stereo imaging device 102 may be positioned to image objects 104, such as pills, capsules, tablets ("pills"), or any other object, that may be transparent or solid. In one embodiment, a conveyor belt 106 may be utilized to transport or move the objects 104 through a field-of-view of the stereo imaging device such that imaging 108 of the objects 104 may be performed. The imaging 108 make capture objects 104 within a scene 110 of the stereo imaging device 102. In the event that the stereo imaging device 102 is a linear camera, then the array of pixels may capture a single scan line as the conveyor belt 106, or other motion equipment, moves the objects 104 across the field-of-view of the stereo imaging device 102.

The stereo imaging device 102 may communicate stereo image data 112 to a computer system 114. The stereo image data 112 may be one or more data streams or data sets of images captured by the stereo imaging device 102, which may include a pair of cameras.

The computing system 114 may include a processing unit 116, which may include one or more computer processors, general purpose, image processing, signal processing, etc., that executes software 118 for performing image, signal, or any other data processing. The processing unit 116 may be in communication with memory 120 configured to store data and/or software code, input/output (I/O) unit 122 configured to communicate with the stereo imaging device 102 and/or any other device or communications network, and storage unit 124, which may be configured to store one or more data repository is 126a-126n (collectively 126). The data repositories 126 may be configured to store data collected from stereo imaging the objects 104 in a real-time manner or data processed from the stereo image data 112 as processed by the processing unit 116, as further described herein. Moreover, the data repositories 126 may store template data that may be used to determine object types by comparing objects scanned with the template data.

In operation, the computing system 114 may receive stereo image data 112 from the stereo imaging device 102, and determine whether objects 104, which may be transparent, solid, or missing, and generate a report (see, for example, FIG. 5), which may be an image or otherwise, such that the system architecture 100 operates as an inspection system for quality control purposes or otherwise.

With regard to FIG. 2, an illustration of an illustrative 3D stereo reconstructed image data inclusive of objects, in this case pills, is shown. The image 200 may be a 3D stereo reconstruction of blister packaging 202 inclusive of multiple alveolus 204a and 204b (collectively 204) in which pills 206a and 206b (collectively 206) reside. The pill 206b has a damage region 208 that is captured by a stereo imaging device, such as that shown in FIG. 1, as a result of having high-resolution imaging capabilities. Although the pills 206 that reside in the alveoli are solid, imaging transparent or specular pills is more difficult as a result of brightness that reflects from the bottom of the alveoli having about the same reflectance with and without a transparent object therein. It should be understood that the blister packaging 202 is illustrative, and that alternative packaging in which objects may be packed for consumer or other purposes may be utilized, as well. In one embodiment, the images of FIG. 2 and other images contained herein may be collected from the stereo imaging device 102 and formed by processing unit 116 of FIG. 1.

With regard to FIG. 3, an illustration of an illustrative high resolution, 3D stereo reconstruction image 300 of a blister package 302 inclusive of empty and populated alveoli 304a-304j (collectively 304) is shown. Empty alveoli or compartments include alveoli 304c, 304f, 304i, and 304j. Transparent pills, represented by noise 306a, 306b, and 306c (collectively 306), are positioned in respective alveoli 304a, 304b, and 304e. Normal or solid pills 308a, 308b, and 308c reside in respective alveoli 304d, 304g, and 304h. The noise 306 may result from reflections of light from light emitting diode (LED) lighting or other lighting reflecting from the transparent pill and/or bottom of the alveolus that causes a stereo matching algorithm, as understood in the art, to return inaccurate depth/Z values (i.e., noisy values). The noise 306 is distinguished from the normal pills 308 and empty alveoli, which are not inaccurate. Threshold values that distinguish between an empty alveolus, normal pill, and transparent pill may be utilized so as to provide for automated inspection analysis, as further described herein. It should be understood that alternative lighting that results in less or more noise, depending on how a measurement algorithm reacts to the lighting so as to improve measurement of transparent pills.

With regard to FIG. 4A, an illustration of a color image 400a inclusive of one or more alveolus being empty, having transparent pills, and having normal pills, is shown. The color image 400a includes blister packaging 402 inclusive of multiple rows 404a, 404b, 404c and columns 406a, 406b, 406c of alveoli or compartments in which pills are to be populated. Alveoli 404a/406a, 404b/406a, and 404c/406a are empty, alveoli 404a/406b, 404a/406c, and 404b/406c have normal pills contain therein, and alveoli 404b/406b, 404c/406b, and 404c/406c include transparent pills. The color image 400a, however, is a two-dimensional image and difficult to use for determining whether an alveolus is empty or has a transparent pill due to the reflection of the bottom of the alveolus that passes through a transparent pill.

With regard to FIG. 4B, an illustration of a height or depth map 400b generated from 3D reconstruction of image data from the color image 400a, and inclusive of alveoli being empty, including transparent pills, and including normal (e.g., white) pills is shown. The reconstructed blister package 402' is shown to include the rows 404' and columns 406' of alveoli. As typically performed, the depth map 400b is produced by setting pixels darker for objects that are farther from an imaging device and pixels lighter for objects that are closer to an imaging device. It should be understood that other coloring, shading, brightening, or other imaging technique may be utilized in reconstructing the height map 400b. As shown, the empty alveoli along column 406a' are empty, alveoli 404a'/406b', 404a'/406c', and 404b'/406c' include solid (white) pills, and alveoli 404b'/406b', 404c'/406b', and 404c'/406c' have noise values that are noisy (i.e., both dark and light) as a result of the 3D reconstruction or stereo matching algorithm producing inaccurate depth.

With regard to FIG. 5, an illustration of an output or report 500 of an inspection tool indicating which alveolus are empty, include transparent pills, and include normal pills is shown. The report 500 is graphical that matches a scene (or scan of objects passing through a scene in the field-of-view of a stereo imaging device. As shown, the report 500 shows a first brightness level representing blister packaging 502 that includes rows 504a-504c (collectively 504) and columns 506a-506c (collectively 506). At the alveoli, different colors, such as red (e.g., empty), green (e.g., normal pill), and yellow (e.g., transparent pill) may be displayed so that an inspector watching an electronic display on which the report 500 is being displayed can see for quality control purposes. In one embodiment, a report may also be in the form of data that, in response to determining that an empty alveolus exists, may be communicated to a controller of a conveyer belt (or other motion device) to cause the conveyer belt to stop moving, thereby enabling an operator to remove the packaging. Other conditions where incorrectly placed pills (or other objects) may also trigger reports, messages, alerts, or otherwise.

Figure 6:
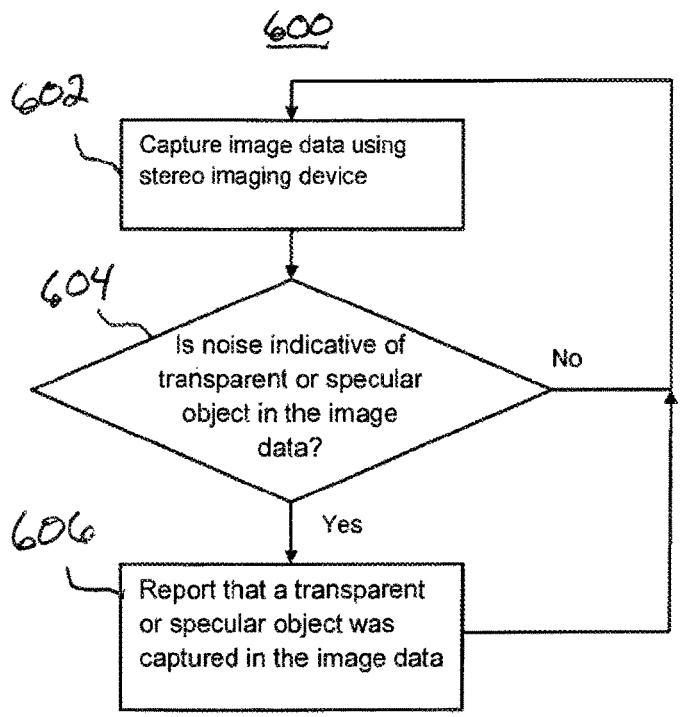
FIG. 6 is a flow diagram of an illustrative process for capturing image data to determine whether a transparent or specular object exists in the captured image data.

With regard to FIG. 6, a flow diagram of an illustrative process 600 for capturing image data to determine whether a transparent or specular object exists in the image data is shown. The process may start at step 602, where image data using a stereo imaging device may be captured. The stereo imaging device may be a color linear imaging device, which may operate at rates higher than other imaging devices for certain inspection operations. At step 604, a determination as to whether noise indicative of a transparent or specular object exists in the image data. The noise may result from processing the image data to render a 3D image, populate a depth map, or perform other image or signal processing. If it is determined at step 604 that no noise exists that is indicative of a transparent or specular object, then the process 600 may return to step 602. If it is determined at step 604 that noise does exist that is indicative of a transparent or specular object, then the process 600 may continue at step 606, where a report that a transparent or specular object was captured in the image data. It should be understood that the process 600 is illustrative, and that alternative processes may be utilized in response to determining or not determining that a transparent or specular object exists in the image data. The report may include a control message communicated to a controller, optionally executing on the same processor as the process 600, to cause a motion device, such as a conveyer belt, to stop or slow so that an operator or machine (e.g., robotic arm) may remove or otherwise alter a defective product.

Figure 7:
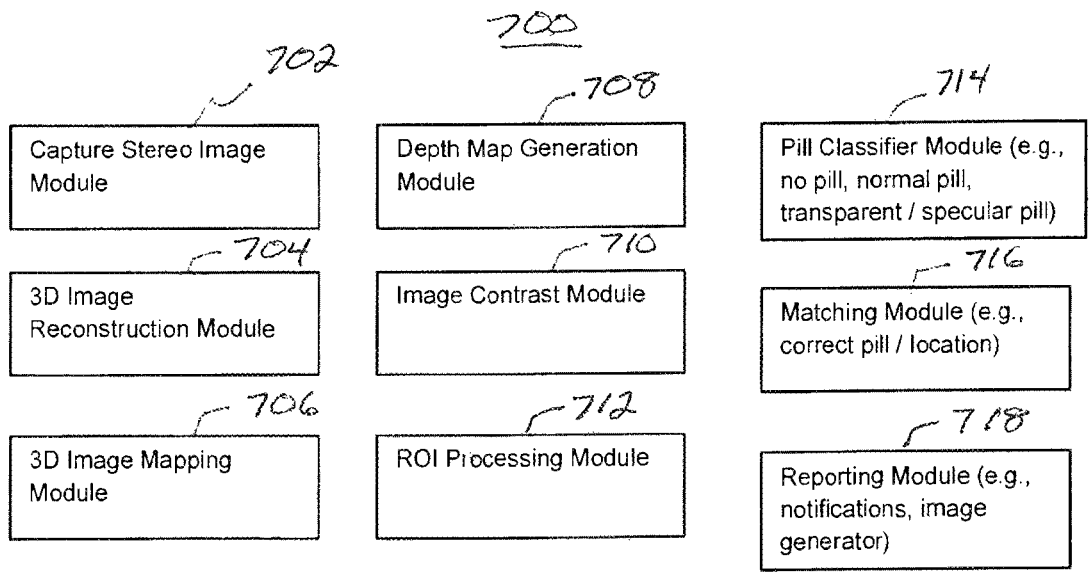
FIG. 7 is a block diagram of illustrative software modules that may be executed on a processing unit to perform image processing in determining whether transparent or specular objects exist in captured image data.

With regard to FIG. 7, a block diagram of illustrative software modules 700 that may be executed on a processing unit to perform image processing in determining whether transparent or specular objects exist in captured image data is shown. In one embodiment, at least a portion of the modules 700 may be executed on the computing system 114 by the processing unit 116 of FIG. 1. However, the modules 700 may be executed by alternative configurations of inspection systems, as well.

A capture stereo image module 702 may be configured to capture an image of an object. The module may cause an image to be captured using a stereo imaging device, such as a pair of linear cameras. The module may be configured to read in a stream of image data being captured in a scene in a field-of-view of the stereo imaging device, and store and/or prepare the captured image data for processing by other modules.

A 3D image reconstruction module 704 may be utilized to reconstruct a 3D image from the captured image data. A variety of 3D image reconstruction modules may be utilized, but ones that are specifically configured to handle data from a linear camera if a linear camera is utilized.

A 3D image mapping module 706 may be configured to map the reconstructed 3D image onto a 3D graph based on x, y, z coordinates determined by the 3D image mapping module. By mapping specific coordinates, actual measurements may be made on pills or other objects for inspection purposes, for example. Such measurements may not be possible with depth maps.

A depth map generation module 708 may be configured to generate intensity values based on measured distances of points of objects from the stereo imaging device. The intensity values may range from light to dark, where closer points are light and farther points are dark. The intensity value range may be calibrated from a maximum brightness to a minimum brightness so that object identification, noise identification, and other image processing functions may be more easily performed. The module 708 may operate to process a 2D representation of 3D data. While the use of a depth map may operate to perform such functionality, it should be understood that alternative 2D representations of 3D data are possible, as well.

An image contrast module 710 may be configured to establish contrast of pixels in conjunction with the depth map generation module 708 (or integrated into the depth map generation module 708). The image contrast module 710 may be used to set brightness of each pixel within a maximum and minimum brightness range as set for a maximum and minimum range for objects to be imaged (e.g., front of pill and bottom of alveolus).

A region-of-interest (ROI) processing module 712 may be optionally utilized to read and process image data from a subset of imaging pixels to assist in determining object types being imaged in alveoli or other regions. Using ROI processing 712 may limit speed of processing the image data as a result of using filtering and address data artifacts resulting therefrom.

A pill classifier module 714 may be configured to determine what type of pill (e.g., no pill, normal pill, transparent/specular pill) is being imaged based on characteristics of the pills. The module 714 may utilize threshold values, such as 50% and 85% intensity values, if using a depth map, to determine that (i) no pill is in an alveolus (low intensity), (ii) a normal pill is in an alveolus (high intensity), or (iii) a transparent or specular pill is in an alveolus or compartment (medium intensity due to noise). It should be understood that the classifier module 714 (or another classifier module) may be configured to determine other types of objects that are being imaged using pattern recognition, depth recognition, or any other suitable image processing and recognition techniques, as understood in the art. The pill classifier module 714 may be configured to classify pills or other objects based on actual dimensions if a 3D mapping is used or pixel intensities if a depth mapping is used.

A matching module 716 may be configured to match whether an object is in the correct location or not. For example, in the case of inspecting blister packaging with pills in compartments of the blister packaging, the module 716 may access stored data and compare the imaged data (or data produced by any of the other modules) to determine whether the blister packaging is properly filled with the correct pills in the correct locations. The module 716 in one embodiment may inspect that each compartment is filled with a pill independent of color, transparent, or with particular colors (e.g., red, green, blue). That is, the module 716 may determine that the pills within the compartments are correctly placed based on the color, transparency, or otherwise. The module 716 may generate a report signal, such as correct or incorrect object placement signals, and communicate those signals to a reporting module or controller module that may cause machinery to notify an operator or cause the machinery to perform an action, such as stop, reroute, pick up, etc., thereby providing for improved quality.

A reporting module 718 may be configured to receive information from one or more other module and generate a report. The report may include notification signals, image generation signals, text report, numerical reports (e.g., number of pass/fail pill placements), and so on. The report, in the case of a human readable report, may be displayed on an electronic display. For example, and as shown in FIG. 5, an image of a blister pack with superimposed colors on an image of object(s) being inspected that are indicative of pass (green) or fail (e.g., red). Also, colors, patterns, words, or any other graphics indicative of type of imaged object may be displayed in a manner that assists an operator may be produced by the module 718. Still yet, sounds or other sensory operation may be caused to be produced by the module 718. Summary reports with statistics of production of the objects (e.g., pills) over a time period may also be produced by the module 718.

Figures 8A, 8B:
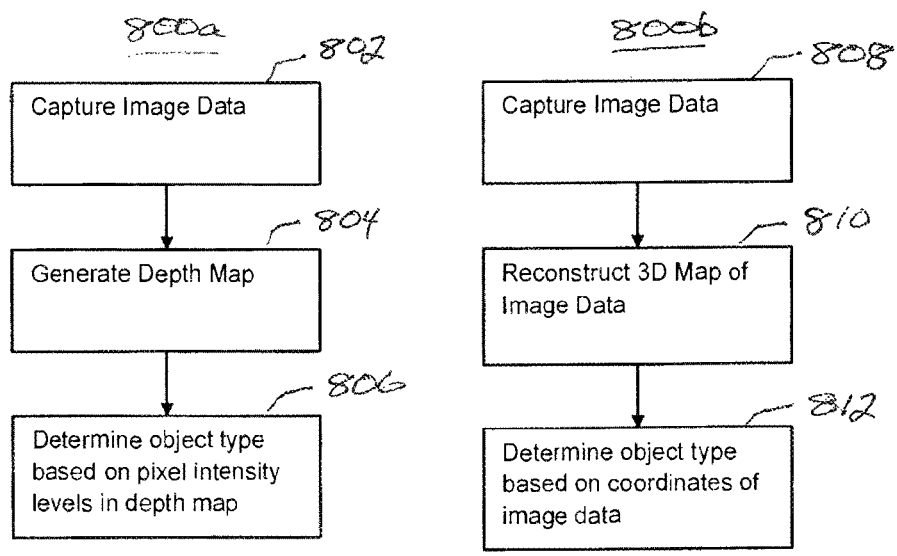
FIG. 8A is a flow diagram of an illustrative process for determining object types based on pixel intensity levels in a depth map.
FIG. 8B is a flow diagram of an illustrative process for determining object type based on mapped coordinates of image data.

With regard to FIG. 8A, a flow diagram of an illustrative process 800a for determining object types based on pixel intensity levels in a depth map is shown. The process 800a may start at step 802, where image data may be captured. The image data may be captured by a stereo imaging device, such as a pair of linear cameras for speed and resolution purposes, as may be specified by a high-rate production operation for production of pills or other objects that may be transparent or specular. At step 804, the process may generate a depth map, which is understood to be one embodiment of a 2D representation of a 3D image, by generating pixels that vary in intensity based on distance from the stereo imaging device. In setting the intensity of each of the pixels, an image contrast algorithm may be utilized on a real-time basis.

An object type may be determined based on pixel intensity levels in the depth map at step 806. In determining the object type, one or more threshold levels for intensity may be set for use in determining whether a compartment is empty, has a normal pill, or has a transparent or specular pill contained therein. For example, threshold levels of 50% and 85% may be set, where an average intensity value in a compartment may be compared against the threshold levels, so if the average intensity value is below 50%, a compartment is determined to be empty, if the average intensity value is above 85%, a compartment is determined to contain a normal pill, and if the average intensity value is between 50% and 85%, then a compartment is determined to contain a transparent or specular pill. It should be understood that additional and/or alternative threshold levels, statistical methodologies, and so forth may be utilized in determining object type. For example, rather than using average intensity value, a total number of pixels may be counted to determine whether more or fewer are above or below the threshold value(s).

With regard to FIG. 8B, a flow diagram of an illustrative process for determining object type based on mapped coordinates of image data is shown. The process 800b may start at step 802, where image data may be captured. The image data may be captured by a stereo imaging device, such as a pair of linear cameras for speed and resolution purposes, as may be specified by a high-rate production operation for production of pills or other objects that may be transparent or specular. At step 804, the process may reconstruct a 3D map of the image data. The 3D map, which may be a Z map, allows for processing the real Z coordinates of an imaged object. The 3D map may be formed by applying measured data from the captured image data from the stereo imaging device.

An object type, such as an empty alveolus, normal pill, or transparent/specular pill, may be determined based on positioning of the data in the 3D map at step 806. In determining the object type, one or more threshold levels for Z coordinates may be set for use in determining whether a compartment is empty, has a normal pill, or has a transparent or specular pill contained therein. For example, a threshold level of 50% of the height and 85% of the height of the object may be set, so if the average height value on the 3D map is below the 50% threshold value, a compartment is determined to be empty, if the average intensity value is above 85%, a compartment is determined to contain a normal pill, and if the average intensity value is between 50% and 85%, then a compartment is determined to contain a transparent or specular pill. It should be understood that additional and/or alternative threshold levels, statistical methodologies, and so forth may be utilized in determining object type.

In addition to determining object type, damaged objects may be determined by either of the processes 800a or 800b depending on the resolution of the stereo imaging device. In determining damaged objects, such as pill 206b with damage region 208 in FIG. 2, tighter ranges of threshold levels may be established. Alternatively, pattern matching, discontinuity identification, or shadow identification in a smooth surface (e.g., pill surface) may be utilized to determine that a pill (or other object) is damaged.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A method of inspection, comprising:
    receiving a package inclusive of individual compartments within at least a subset of the compartments objects are to be positioned;
    capturing image data including at least a subset of the compartments by a stereo imaging device;
    determining, by a processing unit, whether each of the at least a subset of the compartments:
        (a) are empty;
        (b) include a colored object; or
        (c) include a transparent or specular object, wherein the determination of whether a transparent or specular object exists in the image data is based, at least in part, on noise identified in the image data; and
    reporting, by the processing unit, a result of the determination that at least one of an empty compartment, a colored object, or a transparent or specular object was captured in the image data.

2. The method according to claim 1, wherein capturing further includes capturing using a stereo imaging device inclusive of multiple linear cameras configured to capture the image data.

3. The method according to claim 1,
    further comprising reconstructing a three-dimensional (3D) image from the image data; and
    wherein determining includes applying, by the processing unit, data points representative of the reconstructed 3D image to a three-dimensional map.

4. The method according to claim 3, further comprising:
    determining whether the data points applied to the three-dimensional map are positioned above or below a threshold value; and
    determining whether a transparent or specular objects exist based on a percentage of data points determined to be above or below the threshold value.

5. The method according to claim 1, further comprising:
    generating, by the processing unit, a depth image inclusive of pixels having intensities representative of distance from the stereo image device; and
    wherein determining includes processing the depth image to determine intensities of pixels.

6. The method according to claim 1, wherein determining further includes determining whether a reflection of light on a transparent or specular object exists.

7. The method accord to claim 1, wherein:
    determining whether each of the at least a subset of the compartments are empty or include an object includes generating a contrast of the captured image data of each individual compartment;
    determining whether each of the at least a subset of compartments (a) is empty, (b) includes a colored object, or (c) includes a transparent or specular object; and
    generating a report inclusive of whether each of the at least a subset (a) is empty, (b) includes a colored object, or (c) includes a transparent or specular object.

8. The method according to claim 7, wherein generating the report includes generating an image of the package and color-coded representations of objects indicative of the at least a subset of compartments being (a) empty, (b) inclusive of a colored object, or (c) inclusive of a transparent or specular object.

9. The method according to claim 7, further comprising capturing image data of the at least a subset of the compartments substantially simultaneously.

10. The method according to claim 1, wherein capturing image data includes capturing image data in a region-of-interest.

11. The method according to claim 1,
wherein capturing the image data includes capturing the image data as two-dimensional (2D) image data representative of a 3D image; and
wherein determining includes processing the image data using the two-dimensional image data to determine if a transparent or specular object exists therein.

12. A method of inspection, comprising:
capturing image data by a stereo imaging device;
determining, by a processing unit, whether noise indicative of a transparent or specular object exists in the image data;
reporting, by the processing unit, that a transparent or specular object was captured in the image data; and
responsive to determining that a transparent or specular object is missing or in an incorrect location, initiating by the processing unit, movement of the transparent or specular object to be automatically stopped.

13. The method according to claim 12, further comprising:
determining, by the processing unit, whether an object in the image data is a normal pill that has a color and is within an alveolus; and
determining, by the processing unit, whether the normal pill is a correct pill to be in the alveolus based on the color.

14. An inspection system, comprising:
a stereo imaging device configured to capture image data within a field-of-view of a package inclusive of individual compartments within at least a subset of the compartments objects are to be positioned; and
a processing unit in communication with said stereo imaging device, and configured to:
determine whether each of the at least a subset of the compartments:
(a) are empty;
(b) include a colored object; or
(c) include a transparent or specular object,
based, at least in part, on noise identified in the image data; and
report a result of the determination that at least one of an empty compartment, a colored object, or a transparent or specular object was captured in the image data.

15. The inspection system according to claim 14, wherein said stereo imaging device includes multiple linear cameras configured to capture image data.

16. The inspection system according to claim 14, wherein said processing unit is further configured to:
reconstruct a three-dimensional (3D) image from the image data; and
apply data points representative of the captured image to a three-dimensional map.

17. The inspection system according to claim 14, wherein said processing unit is further configured to:
generate a depth image inclusive of pixels having intensities representative of distance from the stereo image device; and
processing the depth image to determine intensities of pixels in determining whether noise indicative of a transparent or specular object exists in the image data.

18. The inspection system according to claim 14, wherein said processing unit is further configured to determine whether a reflection of light on a transparent or specular object exists.

19. The inspection system according to claim 14, wherein said processing unit is further configured to:
determine that a transparent or specular object is missing or in an incorrect location; and
responsive to determining that the transparent or specular object is missing or in an incorrect location, initiate stopping automatic movement of the transparent or specular object.

20. The inspection system according to claim 19, wherein said processing unit is further configured to:
determine whether an object in the image data is a normal pill that has a color and is within an alveolus; and
determine whether the normal pill is a correct pill to be in the alveolus based on the color.

21. The inspection system accord to claim 14, wherein:
said processing unit, in determining whether each of the at least a subset of the compartments are empty or include an object is further configured to:
generate a contrast of the captured image of each individual compartment;
determine whether each of the at least a subset of compartments (a) is empty, (b) includes a colored object, or (c) includes a transparent or specular object; and
generate a report inclusive of whether each of the at least a subset (a) is empty, (b) includes a colored object, or (c) includes a transparent or specular object.

22. The inspection system according to claim 21, wherein the report includes an image of the package and color-coded representations of objects indicative of the at least a subset of compartments being (a) empty, (b) inclusive of a colored object, or (c) inclusive of a transparent or specular object.

23. The inspection system according to claim 21, wherein said stereo imaging device is configured to capture image data of the at least a subset of the compartments substantially simultaneously.

24. The inspection system according to claim 14, wherein said processing unit, in capturing image data, is configured to capture image data in a region-of-interest.

25. The inspection system according to claim 14,
wherein said processing unit, in capturing the image data, is configured to capture the image data as two-dimensional (2D) image data representative of a 3D image; and
wherein said processing unit, in determining, is further configured to process the image data using the two-dimensional image data to determine if a transparent or specular object exists therein.

26. The inspection system according to claim 16, wherein said processing unit is further configured to:
determine whether data points applied to the three-dimensional map are positioned above or below a threshold value; and
determine whether a transparent or specular objects exist based on a percentage of data points determined to be above or below the threshold value.

* * * * *